Dec. 16, 1952 J. H. BARNES 2,621,979
TRIM MEMBER FOR AUTOMOBILE WHEEL ASSEMBLIES
Filed May 23, 1950
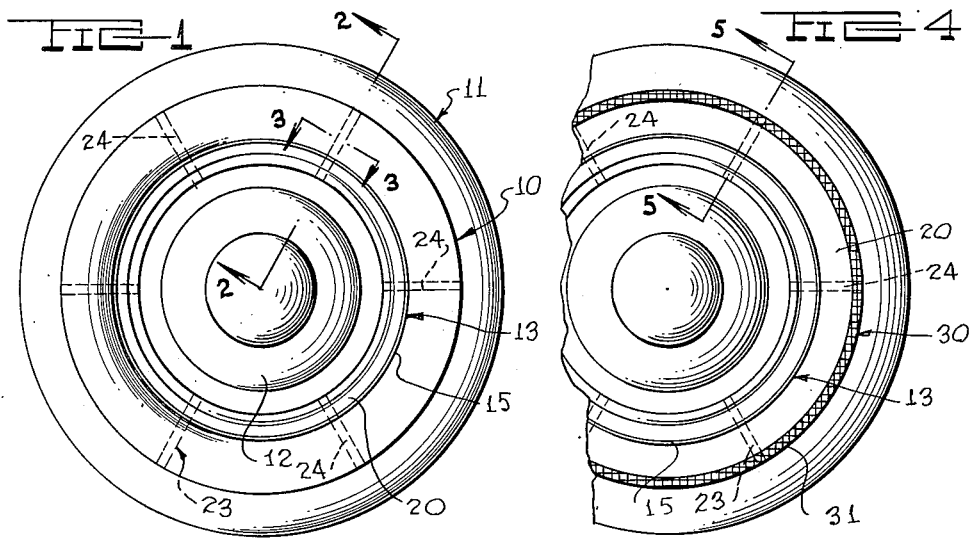
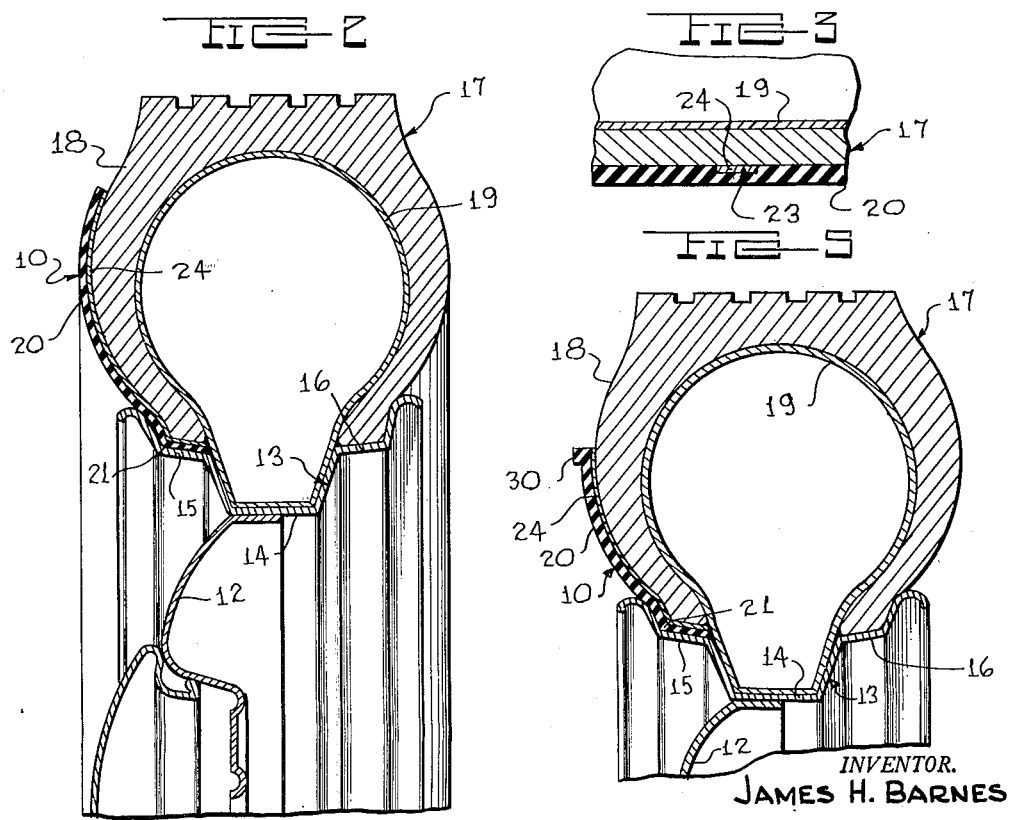
INVENTOR.
JAMES H. BARNES
BY
McMorrow, Berman & Davidson
ATTORNEYS Patented Dec. 16, 1952

2,621,979

UNITED STATES PATENT OFFICE 2,621,979

TRIM MEMBER FOR AUTOMOBILE WHEEL ASSEMBLIES

James H. Barnes, Dunn, N. C.

Application May 23, 1950, Serial No. 163,595

3 Claims. (Cl. 301—37)

This invention relates to a trim member for attachment to an automobile wheel assembly.

An object of this invention is to provide a trim member for attachment to an automobile wheel assembly, which, when assembled with the wheel assembly, will materially enhance the appearance thereof.

Another object of this invention is to provide a trim member for attachment to a pneumatic tire casing having black walls, which, when assembled with the aforementioned casing, will simulate in appearance a tire casing having white walls.

A further object of this invention is to provide a trim member which may be attached to an automobile wheel assembly with speed and facility.

A still further object of this invention is to provide an ornamental trim member for attachment to a pneumatic tire casing which, when assembled with the casing, will protect the side walls thereof against cutting and marring due to contact with curbs and the like.

Other objects of this invention will become apparent upon consulting the drawings in conjunction with the following specification.

In the drawings:

Figure 1 is a side elevational view of the trim member of the present invention, shown supported on an automobile wheel assembly;

Figure 2 is an enlarged fragmentary sectional view taken along the line 2—2 of Figure 1;

Figure 3 is an enlarged fragmentary sectional view taken along the line 3—3 of Figure 1;

Figure 4 is a side elevational view, with parts broken away, of a modified form of the trim member of the present invention, shown supported on an automobile wheel assembly; and Figure 5 is an enlarged fragmentary sectional view taken along the line 5—5 of Figure 4.

Referring now more particularly to the drawings, wherein like reference numerals have been used throughout the several views to designate like parts, there is shown the trim member of the present invention, generally designated by the numeral 10 supported on the wheel assembly 11. The wheel assembly 11 embodies a central load-bearing plate 12 on which is fixedly secured a tire rim 13, the rim embodying a base 14 and opposed tire-engaging side flanges 15, 16. Mounted on the tire rim 13 in engagement with the side flanges 15, 16 thereof is a pneumatic tire casing 17 having an inner tube 19 disposed therein.

The ornamental trim member 10 is fabricated of any suitable synthetic or natural rubber material, and comprises an annular body 20 which is arcuately shaped to conform to the out side wall 18 of the tire casing 17. Fixedly secured to or formed integrally with the inner periphery of the annular body 20 is a skirt 21 which is adapted to be inserted between the tire rim 13 and the adjacent supported portions of the tire casing 17.

Disposed circumferentially of the inner face of the trim member 10 at spaced intervals thereabout are a plurality of radially extending channelways, generally designated by the reference numeral 23. Each of the channelways 23 extends inwardly from the outer periphery of the annular body 20 and terminates contiguous to the free end of the skirt 21.

Fixedly secured within each of the channelways 23 is a resilient member, generally designated by the numeral 24, and illustrated as a flat spring. The resilient member 24 is shaped to conform to the channelway 23, such that a continuous, smooth surface is provided on the inner face of the trim member 10.

In actual use, the trim member is attached to the wheel assembly 11 by deflating the inner tube 19 in an amount sufficient to permit the insertion of the skirt 21 and the adjacent inner peripheral portion of the annular body 20 between the side flange 15 of the tire rim 13 and the adjacent supported portion of the pneumatic tire casing 17. Since the annular body 20 is shaped complementary to the outer side wall 18 of the casing 17, the body will be disposed in confronting relation therewith. The resilience of the respective resilient members 24 is selected such that the confronting face of the annular body 20 will abut and bear against the side wall 18 of the casing 17. It is to be noted that the outer periphery of the annular body 20 terminates at a point adjacent to and spaced from the treaded road-engaging surface of the tire casing 17. Accordingly, the trim member protects the major portion of the exterior side wall 18 of the casing 17 from being marred or cut under normal driving conditions.

The outer face of the annular body 20 is provided with any desired ornamental coating, and is preferably made white, such that when the trim member 10 is assembled with the tire casing having black walls, the assembly will simulate a tire having white walls. In actual manufacture, it may be desirable to fabricate the entire trim member 10 from a synthetic or natural white rubber material.

Referring now with particularity to Figures 4 and 5, there is shown a modified form of the trim member of the present invention. In the modified form the outer peripheral edge of the annular body 20 is provided with an annular bead 30. It is readily apparent that the annular bead 30 may be formed integrally with the body 20, or may be formed separately and secured thereto. The bead 30 may be provided with a coating of black material to materially enhance the appearance of the trim member, as indicated by the reference numeral 31 in Figure 4. The bead 30, if desired, may be fabricated of a black rubber material, such that it will not be necessary to coat the exterior surface thereof. In the modified form, it is to be noted that the outer periphery of the annular body is disposed substantially midway of the side wall 18 of the casing 17.

When using the trim member including the annular bead 30, the bead will contact curbs, and the like while driving and parking. Since the bead 30 is disposed at the widest point of the tire 17, it will keep the outer face of the annular body 20 in a relatively unmarred and uncut condition. When subjected to prolonged use, the bead 30 will be worn away due to the continuous contact with curbs. After the bead 30 has worn away, the outer face of the annular body 20 will continue to protect the tire casing 17 until such time as the trim member must be replaced.

Numerous modifications may be made without departing from the spirit of the invention as set forth in the appended claims.

What I claim is:

1. A trim member for attachment to an automobile wheel assembly including a rim and a tire casing mounted on said rim, said trim member being fabricated of a rubber material and comprising an annular body disposed in confronting relation with the outer side wall of said tire casing, a skirt disposed within said annular body and fixedly secured to the inner periphery thereof, said skirt being adapted for engagement between said tire casing and said rim and supported therebetween, and resilient means carried on the confronting face of said annular body for urging the latter into abutting and embracing relation with respect to said outer side wall of said tire casing.

2. A trim member for attachment to an automobile wheel assembly including a rim and a black wall tire casing mounted on said rim, said trim member being fabricated of rubber and comprising an annular body disposed in confronting relation with respect to the outer side wall of said tire casing, said annular body having its inner peripheral portion turned inwardly to form a skirt for engagement and support intermediate said tire casing and said rim, and resilient means carried on the confronting face of said annular body for urging the latter into abutting and embracing relation with respect to said side wall of said tire casing, the exterior face of said annular body being colored white whereby when said trim member is assembled with said black walled tire casing, the assembly simulates a white walled tire.

3. A trim member for attachment to an automobile wheel assembly including a rim and a tire casing mounted on said rim, said trim member being fabricated of rubber and comprising an annular body disposed in confronting relation with respect to the outer side wall of said tire casing, said annular body having its inner peripheral portion turned inwardly for engagement and support intermediate said tire casing and said rim, an annular bead circumposed about said annular body and fixedly secured to the outer periphery thereof, and resilient means carried on the confronting face of said annular body for urging the latter into abutting and embracing relation with respect to said side wall of said tire casing.

JAMES H. BARNES.

REFERENCES CITED

The following references are of record in the file of this patent:

UNITED STATES PATENTS

| Number | Name | Date |
|---|---|---|
| 1,940,077 | Coe | Dec. 19, 1933 |
| 2,019,120 | Cunningham et al. | Oct. 29, 1935 |
| 2,209,967 | Golod | Aug. 6, 1940 |
| 2,334,388 | Daniel | Nov. 16, 1943 |